United States Patent [19]

Rice et al.

[11] 4,394,878

[45] Jul. 26, 1983

[54] COMBINATION PLANAR MOLDER

[75] Inventors: Verle L. Rice; Dwight E. Check, both of Harrisonville, Mo.

[73] Assignee: R. B. Industries, Pleasant Hill, Mo.

[21] Appl. No.: 283,946

[22] Filed: Jul. 16, 1981

[51] Int. Cl.³ .............................................. B27C 1/14
[52] U.S. Cl. ................................. 144/131; 144/117 R
[58] Field of Search ............... 144/116 R, 117 R, 129, 144/130, 131

[56] References Cited

U.S. PATENT DOCUMENTS

| 2,630,150 | 3/1953 | Lacelle | 144/130 |
| 2,780,251 | 2/1957 | Williams | 144/130 |
| 3,718,168 | 2/1973 | Berends | 144/129 |

Primary Examiner—W. D. Bray

[57] ABSTRACT

This invention relates to a combination planar molder for wood products. A support framework mounts a removable shaft for mounting either a planing knife or a molding bit. The shaft is mounted in bearing means at least one of which is pivotal about its housing so as to permit the shaft to be raised and lowered at an angle and slipped laterally for insertion and removal. This allows one shaft to be utilized for the planing head and a separate shaft to be utilized for a molding head. This eliminates time consuming balancing of the shaft as a result of changing a conventional planing head into a molding head.

9 Claims, 11 Drawing Figures

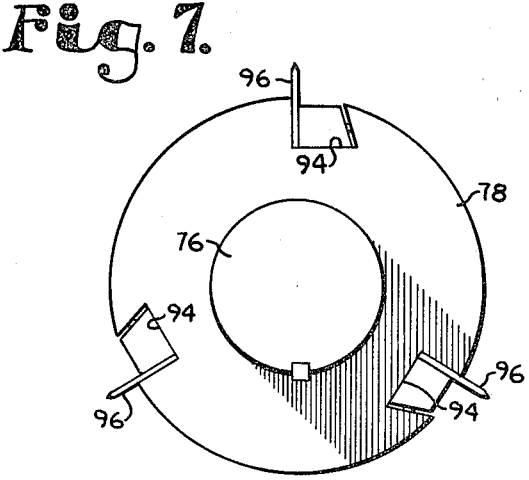
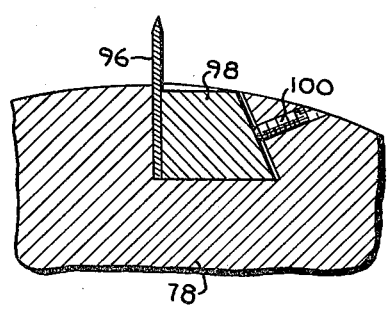
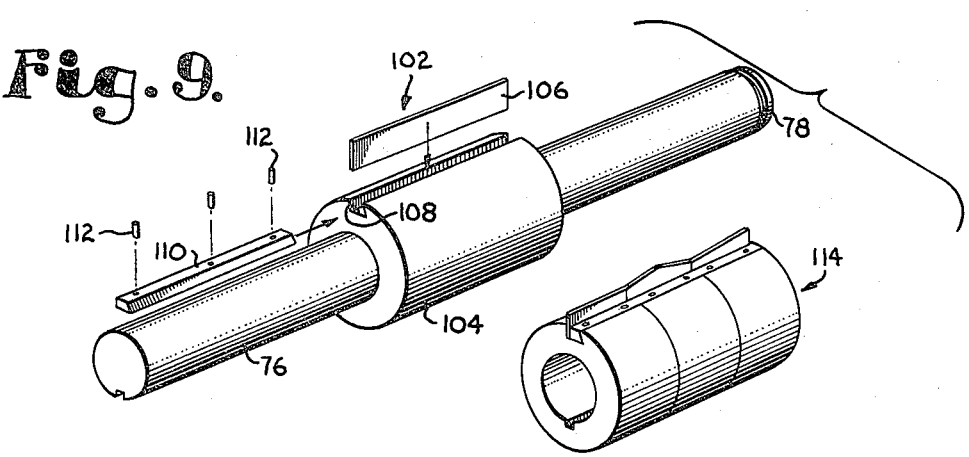
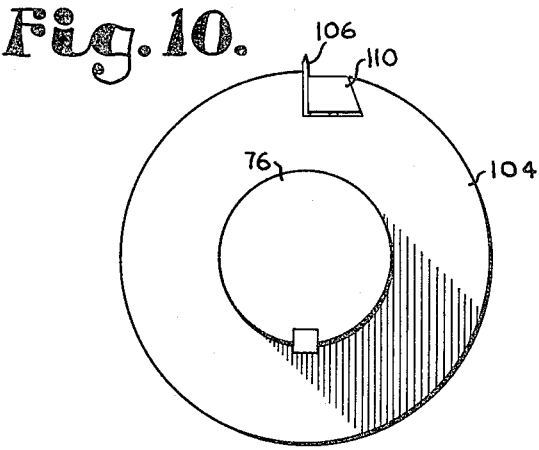
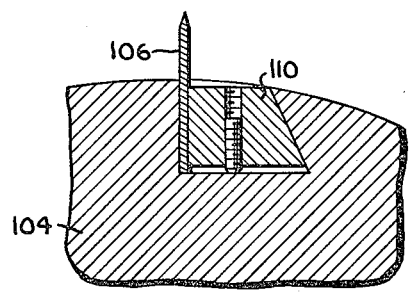

COMBINATION PLANAR MOLDER

This invention relates generally to woodworking equipment and, more particularly, to a combination planar molder having quick change mounting means for the planing knives and molding bits.

Power planars have long been used in the finishing of board lumber and likewise for the recycling of lumber which has become badly weathered. Similarly, power molding heads are used to form patterns in woodwork including tongue and groove configurations for joining two pieces of wood together. In many instances, it is not practical for the hobbyist or even the small workworking shop to have two separate machines for both planing and molding operations. Accordingly, it has been customary for the manufacturers of certain types of planing machines to offer a molding head option in conjunction with the planar. In order to utilize the molding bits on a combination planar molder of the prior art, it has been necessary to remove the long planing knives which extend across the planing head and replace the knife with a bit for molding. This entails insertion of filler gibs on either side of the molding head and also the placement of counterweights on the head opposite the bit so as to compensate for removal of the planing knife and insertion of the bit. This is a time consuming, labor intensive procedure. Furthermore, because a single head is utilized for both planing knives and molding bits, use of the molding bits is restricted to the center portion only of the planing head. There is also some danger of the restraining gibs which are utilized for holding the molding bits coming out of the head because the gibs and their retaining grooves must accommodate both the molding bits and the planing knives.

It is the primary object of the present invention to provide a combination planar molder having a removable shaft for mounting either a planing head or a molding head whereby the function of the machine can be quickly and efficiently varied.

As a corollary to the above object, an important aim of the invention is to provide a combination planar molder having a removable shaft for mounting either a planing head or a molding head which permits changing of the function of the device without the need to rebalance the machine head.

It is also an important aim of the invention to provide a combination planar molder wherein the molding bits may be located at any position along a mounting shaft and multiple molding heads can be accommodated on the same shaft.

Still another one of the objects of the invention is to provide a combination planar molder wherein an individualized planing head and an individualized molding head is provided thereby offering safer construction than with prior art devices where a single head was used to mount both planing knives and molding bits.

Other objects of the invention will be made clear or become apparent from the following description and claims when read in light of the accompanying drawing wherein:

FIG. 7 is an enlarged side elevation of a molding head;

FIG. 8 is an enlarged cross-sectional view of a molding head illustrating the manner in which bits are held in place;

FIG. 9 is a perspective view of a mounting shaft having a head for receiving a custom forming knife;

FIG. 10 is an elevational view of the shaft and mounting head illustrated in FIG. 9; and FIG. 11 is an enlarged cross-sectional view of the head shown in FIG. 10.

Figure 1:
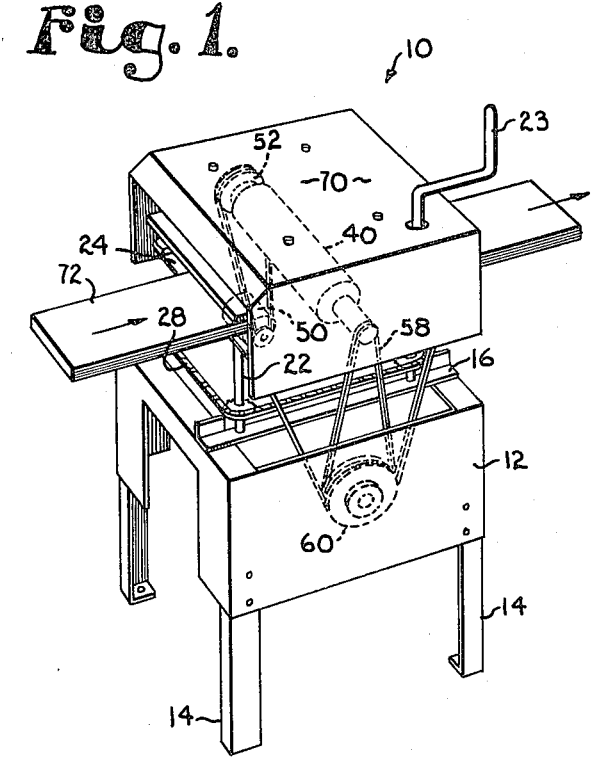
FIG. 1 is a perspective view of the combination planar molder of the present invention.

Referring initially to FIG. 1 of the drawings, the combination planar molder of the present invention is designated generally by the numeral 10 and includes a supporting framework 12 positioned on four rigid legs 14. The framework 12 includes angle iron supports 16 which in turn mount vertically extending sidewalls 18. Each of sidewalls 18 is provided with a slot 20 which is open along the uppermost edge of the sidewall.

Supports 16 also mount threaded upright shafts 22 which in turn threadably mount a work platform 24. Sprockets 26 are keyed to shafts 22 and joined for common movement by a continuous chain 28. Thus, platform 24 may be raised or lowered by turning one of the shafts 22 through a crank 23.

Sidewalls 18 are also provided with closed slots for mounting drive rollers 30 each of which is biased downwardly by springs 32 (FIG. 4) disposed at opposite ends of the roller shaft.

Figure 3:
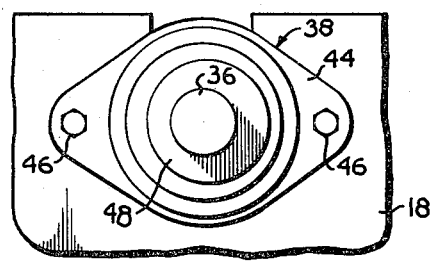
FIG. 3 is an enlarged elevational view of the bearing assembly which receives one end of the mounting shaft.
Figure 2:
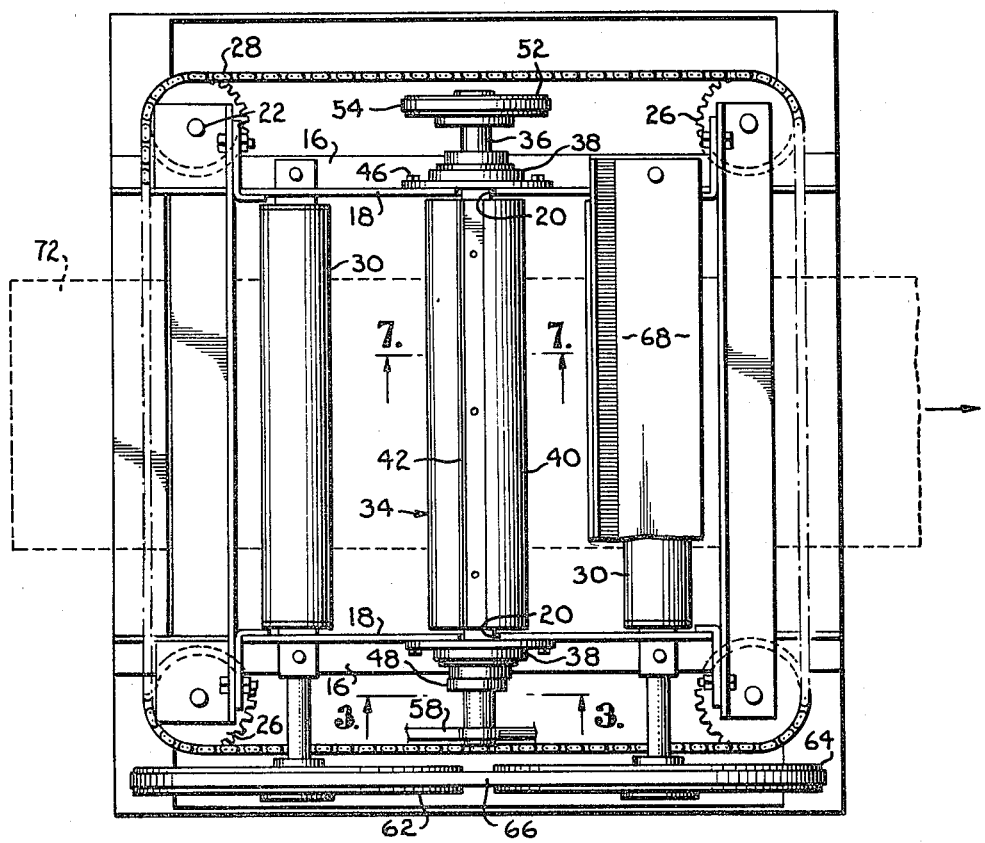
FIG. 2 is a top plan view of the device of FIG. 1 with its top cover removed.

Mounted in slots 20 is a removable planing head designated generally by the numeral 34. Planing head 34 comprises a shaft 36, bearing assemblies 38, planing head cylinder 40, and a plurality of planing knives 42. As illustrated in FIG. 3, bearing assembly 38 includes a housing 44 secured to the adjacent sidewall 18 by bolts 46. Bearing 48 is mounted for pivotal movement relative to the housing.

The drive train for the shaft 36 and rollers 30 will now be described. An electric motor 50 is mounted on framework 12 and has its output shaft coupled with a sheave 52 that is rigid with shaft 36 through a drive belt 54. The end of shaft 36 opposite sheave 52 is provided with an integral recessed sheave 56 (FIG. 4) for receiving a second drive belt 58. Manifestly, the outside diameter of sheave 56 is equal to (and no greater than) the outside diameter of shaft 36. Belt 58 in turn drives a reduction sheave 60 which in turn drives sheaves 62 and 64 through a drive belt 66. Sheaves 62 and 64 are rigid with the shafts of drive rollers 30.

A deflector plate 68 prevents trimmings from being directed toward the machine outlet and a hood 70 covers the entire working mechanism.

In operation, motor 50 is actuated to turn planing head 34 and drive rollers 30. A board 72 is placed on work platform 24 and will be pulled through the device by rollers 30. Platform 24 may be raised or lowered to the desired level so as to achieve removal of the proper amount of surface from board 72.

Figure 4:
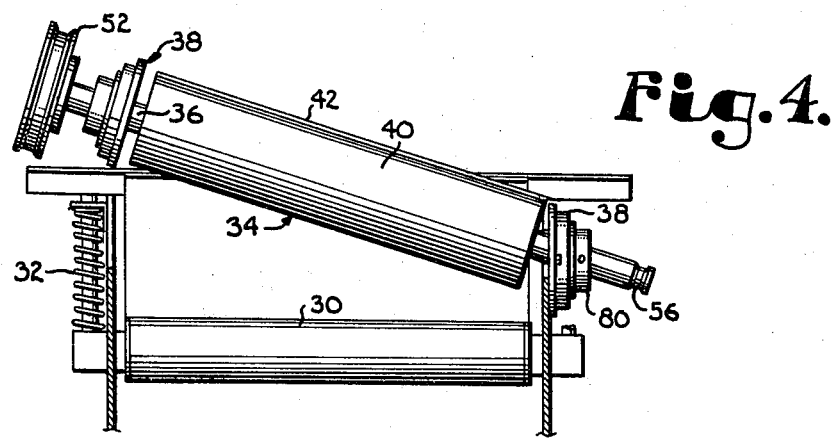
FIG. 4 is a front elevational view illustrating the manner in which the shaft for the planing head is removed.

When it is desired to vary the function of device 10 from a planing machine to a molding machine, hood 70 is removed and planing head 34 may be easily detached in the following manner. Belt 54 is removed from sheave 52 and bolts 46 are loosened so as to free the bearing assembly 38, which is closest sheave 52, from sidewall 18. As illustrated in FIG. 4, the entire planing head assembly 34 is then tilted upwardly so as to allow the cylinder 40 to clear sidewall 18. This movement is accommodated by virtue of the pivotal mounting of bearing 48 at the end of shaft 36 opposite sheave 52. Once the planing head assembly 38 has assumed its canted position as illustrated in FIG. 4, it is possible to remove belt 58 from sheave 56 and simply slide shaft 36 laterally thereby freeing the planing head assembly from the supporting framework.

Figure 5:
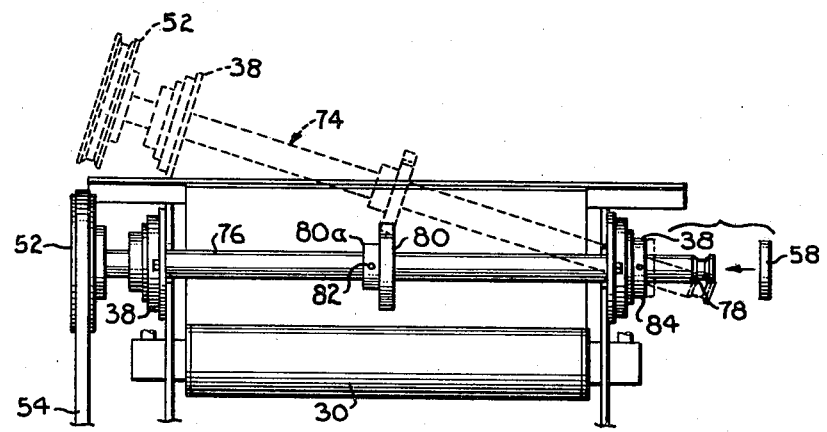
FIG. 5 is another front elevational view illustration the manner of insertion and removal of the molding head shaft.

Referring now to FIG. 5, the device 10 will also readily accommodate a molding head designated generally by the numeral 74. Molding head assembly 74 includes a shaft 76 having an integrally formed recessed sheave 78 and bearing assemblies 38 as previously described. Sheave 78, like sheave 56, has an O.D. that is equal to (and no greater than) the O.D. of shaft 76. One or both of bearings 38 may be the same assemblies used in conjunction with planing head 34. A sheave 52 as previously described is keyed to shaft 76 for receiving drive belt 54. A bit holder 80 is positioned on shaft 76 and is held in place by a set screw 82 passing through hub 80a.

Shaft 76 is inserted into bearing 38 and the other bearing 38 is mounted on sidewall 18 in the manner previously described. Belts 54 and 58 are trained over sheaves 52 and 78, respectively. Lock ring 84 precludes lateral movement of the shaft once it is in place. Belt 58 drives a reduction sheave 60 and sheaves 62 and 64 in the manner previously described. It is to be understood that bit holder 80 may be positioned anywhere along the length of shaft 76 and multiple bit holders 80 may be positioned in side-by-side relationship.

Figure 6:
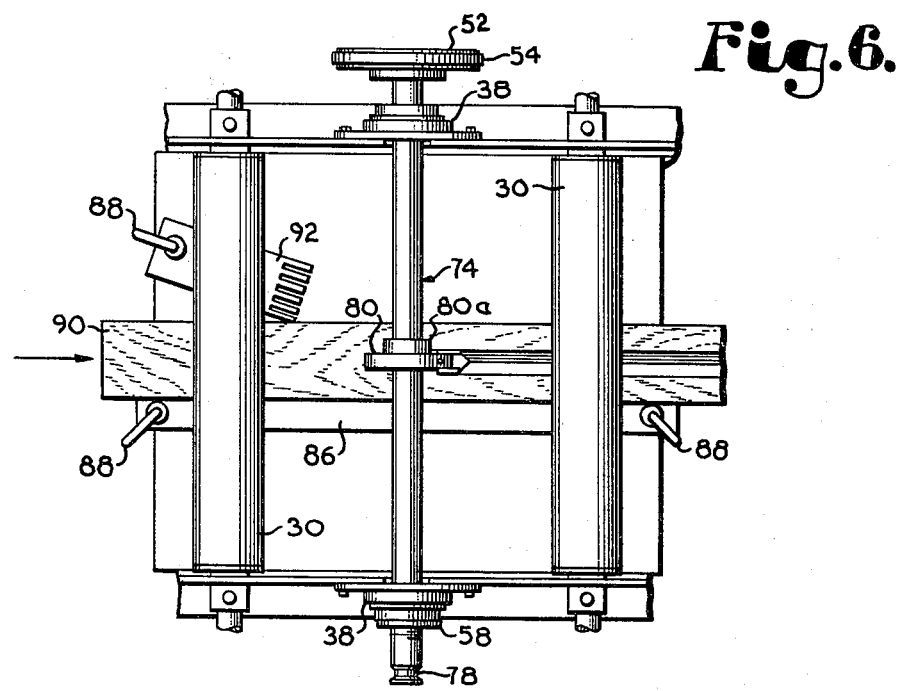
FIG. 6 is another top plan view after removal of the top cover illustrating the manner of use of the molding head.

The molding head assembly of the device is utilized in the manner illustrated in FIG. 6 with a guide board 86 held in place by C-clamps 88 providing a side edge along which the board 90 to be molded can be passed. Board 90 is fed into the machine and driven past molding head 74 by rollers 30. A feather board 92 held in place by a C-clamp 88 precludes a lateral movement of the board to be molded.

FIGS. 7 and 8 represent enlarged detailed drawings of bit holder 80. The bit holder is provided with a plurality of grooves 94 which receive bits 96. Each bit is held in place by a gib 98 secured by a set screw 100.

Another accessory for device 10 is illustrated in FIGS. 9 through 11. A custom knife head 102 is provided which incorporates shaft 76 and a cylinder 104. A knife blade 106 is held in a groove 108 by gib 110 and set screws 112. An alternative knife configuration which can also be received by shaft 76 is designated by the numeral 114. Custom knives 102 and 114 are utilized in the same manner as molding head 74 heretofore described.

We claim:

1. A combination planar molder for wood comprising:
   a support framework;
   shaft means mounting either a planing knife or a molding bit;
   means for removably mounting said shaft means on said framework and comprising a sheave rigid with said shaft and bearing means mounted in said framework for pivotal movement and adapted to receive one end of said shaft means;
   prime mover means for turning said shaft means; and
   drive means for moving a length of wood past said planing knife or said molding bit.

2. The invention of claim 1, wherein said shaft includes a second sheave on the end opposite said first sheave.

3. The invention of claim 1, wherein is included a second sheave formed on said shaft.

4. The invention of claim 1, wherein said drive means includes first and second drive rollers disposed on opposite sides of said shaft means.

5. The invention of claim 1, wherein is included a platform mounted on said framework for supporting a piece of wood in working relationship to said shaft means; and means for raising and lowering said platform relative to said shaft means.

6. A combination planar molder for wood comprising:
   a support framework;
   means mounting either a planing knife or a molding bit on said framework,
   said mounting means comprising a shaft, a first sheave rigid with said shaft, a second sheave integrally formed into said shaft and first and second bearing means for receiving said shaft;
   prime mover means mounted on said framework and rotatably coupled with said first sheave for rotating said shaft;
   first and second drive rollers disposed on said frame on opposite sides of said mounting means;
   reduction drive means for driving said first and second drive rollers; and
   means coupling said second sheave with said reduction drive means.

7. The invention of claim 6 wherein said shaft is movable laterally relative to one of said bearing means.

8. The invention of claim 7, wherein said one bearing means is pivotal about an axis to facilitate insertion and removal of said shaft.

9. The invention of claim 6, wherein is included a platform mounted on said framework for supporting a piece of wood in working relationship to said mounting means; and means for raising and lowering said platform relative to said mounting means.

* * * * *